United States Patent Office 3,338,953
Patented Aug. 29, 1967

3,338,953
PREPARATION OF UNSATURATED NITRILES
Satish C. Malhotra, Wenonah, N.J., assignor to E. I. du Pont de Nemours and Company, Wilmington, Del., a corporation of Delaware
No Drawing. Filed June 14, 1965, Ser. No. 463,950
5 Claims. (Cl. 260—465.3)

The present invention relates to a process for preparing nitriles.

U.S. Patent 2,736,739 describes the synthesis of nitriles by the catalytic vapor-phase reaction of nitric oxide with alkyl-substituted organic compounds containing at least one alkyl, preferably methyl, group directly attached to a carbon atom which is, in turn, attached to another carbon atom by a double bond. For example, in one embodiment of the process of the aforesaid patent, acrylonitrile is prepared by the reaction of propylene and nitric oxide in the presence of a silver-on-silica catalyst. This invention provides an improvement in the basic process described in U.S. Patent 2,736,739.

When a chemical process is evaluated from the standpoint of feasibility of commercial-scale operation, consideration is given to the extent to which the starting materials are utilized in producing the desired products as well as to the operating conditions required to achieve such utilization, e.g., the reaction time and temperature required; the nature of the feed and process streams; and, based on the latter, the degree of separating and recycling required. Naturally, shorter reaction times, less-elevated temperatures, and a minimum of separating and recycling are desirable because of more economical and less troublesome operation. Thus, while in a catalytic process it obviously is desirable to employ a system in which the catalytic agent exhibits a high degree of activity and selectivity, i.e., is one which promotes the conversion of a high proportion of the reactants to the desired product, it is also desirable that good catalytic performance be achieved under economically acceptable operating conditions.

The activity and selectivity of a catalyst are judged from the conversion and yield obtained. As applied herein to a process wherein nitric oxide reacts with an alkyl-substituted organic compound containing unsaturation as described above, the term "conversion" means the number of moles of the desired nitrile obtained per mole of nitric oxide fed to the reactor; and the term "yield" denotes the number of moles of the desired nitrile obtained per mole of nitric oxide consumed in the reaction (i.e., nitric oxide fed to the reactor less unreacted nitric oxide). Thus, when all other conditions are equal, higher conversions (i.e., higher consumption of reactant) are indicative of catalysts having higher activity, and higher yields (i.e., less by-product formation) are indicative of catalysts having greater selectivity for the desired reaction.

The process described in the aforementioned patent, when applied to propylene, gives acrylonitrile in very low conversions. Certain catalysts have been found, e.g., the lead salt catalysts described in U.S. Patents 3,141,902 and 3,184,415, which give improved conversions to acrylonitrile in this process. However, while such catalysts give a marked improvement, they nevertheless may not afford as high an average conversion and/or yield as is desired; or, the operating conditions required to achieve satisfactory conversions and yields may not be the most satisfactory from the standpoint of economic operation. For example, in some systems, reaction temperatures above 500° C. are required. Secondly, it has heretofore been found necessary to employ an amount of propylene in the process which is greatly in excess of that theoretically required, a propylene-to-nitric oxide molar ratio of at least about 3 to 1 having been required for acceptable performance. Because of the high content of unreacted propylene in the off-gas, for economic reasons it is necessary that the propylene be recycled to the reactor. If the propylene employed contains any appreciable amount of inert gases, it is necessary to separate at least a portion of such gases from the propylene prior to recycle so as to avoid a buildup of inert diluents in the feed gas. Obviously, operation with a lower proportion of propylene relative to nitric oxide in the feed gas would be highly desirable.

Thus, in the described process, improvements in one or both of the two major areas is desirable. Higher average conversions and/or yields are important regardless of whether or not operating conditions can be improved at the same time. On the other hand, a system which permits operating at lower unsaturated compound-to-nitric oxide molar ratios also is important regardless of whether or not conversions and yields are improved. Obviously, a system which effects an improvement in both of these areas as well as in other ways, e.g., by permitting operation at lower reaction temperatures, is most desirable.

This invention provides an improvement in the process for making nitriles by the catalytic reaction of nitric oxide with organic compounds bearing a methyl group bonded to a carbon atom which, in turn, is bonded to another carbon atom by a double bond. As compared to known catalytic processes of this type, the improvement of this invention provides higher conversions and yields at low unsaturated compound to NO ratios and generally better performance under more economical operating conditions. The improved process of this invention is particularly characterized by high conversions and a capability of providing said conversions at shorter reaction times.

The improvement of this invention comprises catalyzing the reaction of nitric oxide and the aforementioned unsaturated compounds with the product obtained by interacting at elevated temperature, that is, calcining, bismuth oxide and germanium oxide. Preferably the catalyst also contains at least one nickel or alkaline-earth-metal oxygen-containing compound.

In the bismuth-containing catalyst used in the process of this invention, bismuth and chemically bound oxygen are held in a crystal lattice in a manner such that the oxygen has a restricted lability under the reaction conditions. "Lability" denotes here the ability of the combined oxygen to be converted to free oxygen in the process in which the catalyst is to be used. In the bismuth-containing catalyst, the lability of the oxygen is restricted, but not hindered completely. "Restricted" denotes that the bound oxygen is released as free oxygen only at a very low rate, and, in particular, at a rate considerably lower than that at which oxygen is released from a 100% bismuth oxide composition or from a composition in which bismuth oxide is present solely in physical admixture, but higher than that from $BiPO_4$. Since elemental bismuth is an inactive component in the present process, and since release of oxygen is associated, either directly or indirectly, with the reduction of the bismuth present to elemental bismuth, the rate of oxygen release should be low in order to avoid the necessity of frequent replacement or renewal of the composition.

Suitable restriction of oxygen lability in a bismuth-containing composition for use in the present process is accomplished by preparing the composition by interaction, at elevated temperature, e.g., a temperature above about 450° C., of bismuth oxide, preferably trioxide, with germanium oxide, preferably dioxide. Depending on the particular material used in preparing the catalysts and the relative proportions thereof, one or more of several types of crystalline interaction products can be present. First, in most cases bismuth germanate is present. Second, the interaction can take the form of a solution process leading to the formation of solid solutions. Third, the interaction can be in the nature of a transformation of the bismuth oxide into new polymorphic modifications containing foreign ions derived from germanium oxide or other optional additives. The lability of the oxygen in the resulting composition depends on the stability of the crystalline phases formed, as well as on the amount of free pure bismuth oxide present, if any, and on how it is distributed through the mass. In any case, the lability of the oxygen will be greatly restricted over that in 100% bismuth oxide, or in a physical mixture containing only non-interacted bismuth oxide, but greater than that in $BiPO_4$. Stated in another way, the bismuth oxide is interacted partially or completely with germanium oxide to form new crystalline phases different from the bismuth oxide starting material as well as from physical mixtures thereof with germanium oxide.

While it is not intended that the present invention be limited by theoretical considerations, it is believed that in the present process the bismuth composition in the form described functions as a true catalyst and, to some degree, as a reactant. Catalytic function requires bismuth oxide in a stabilized form; reactive function requires labile oxygen. Thus, the composition should include an oxygen-containing bismuth compound in a form in which it can release its oxygen at a low rate, e.g., as bismuth oxygenated salts, bismuth oxide solid solutions, and bismuth oxide crystalline modifications containing foreign ions. Free pure bismuth oxide can be present provided the amount is small enough, e.g., less than 50%, and preferably less than 25%, by weight, and the distribution thereof is such that reduction to metallic bismuth at any significant rate is avoided. Free germanium oxide also can be present in similar amounts. Although the bismuth-containing composition is assumed to react to some extent in addition to exhibiting truly catalytic behavior, for simplicity it is referred to herein as a "catalyst."

The nature of the crystalline phases present in the catalysts used in the process of this invention, and consequently the composition of the catalysts, can vary widely and depend on such factors as the particular interactants employed in their formation; the conditions used to prepare the catalyst, e.g., the time-temperature conditions used to bring about interactions; the relative amounts of interactants; etc. In all cases, however, these phases will include a bismuth oxygenated salt, a bismuth oxide solid solution, and/or bismuth oxide crystalline modifications containing foreign ions derived from the germanium oxide and other optional additives. In addition, a small amount of free pure bismuth oxide as well as germanium oxide can be present.

In a preferred form, the catalyst used in the process of this invention is one which contains, in addition to the bismuth and germanium oxide components, an oxygen-containing compound of at least one metal selected from the group consisting of nickel and the alkaline-earth metals, i.e., barium, calcium, strontium, and magnesium. Such optional nickel and alkaline-earth compounds can be present in the form of oxides or salts thereof with one or more of the other interactants. As will be seen from the following examples, modification of the catalyst in this manner affords a means for obtaining satisfactory conversions and yields using more economical operating conditions, e.g., lower contact times and lower unsaturate-to-nitric oxide mole ratios.

As previously indicated, the catalysts used in this invention are prepared by the interaction at elevated temperature of bismuth oxide and germanium oxide. As used herein, reference to the catalysts obtained by the interaction or calcining of the aforementioned "oxides" includes not only the products obtained by mixing and heating the oxides per se, but also the products obtained from compounds which decompose to the oxides at temperatures below those at which there is any substantial or gross fusion of the catalyst or components present during its preparation. The heat treatment is a calcining treatment, that is, heating without substantial fusion until there is phase modification, i.e., until a major proportion, e.g., 50% or more, of the bismuth oxide reacts with, dissolves, or occludes the other components as shown by X-ray analysis.

The range of calcining temperatures which can be employed to prepare the composition varies depending on the particular components which are to interact and on the kind of interaction. In addition, longer calcining times can permit lower temperatures to be used. In general, however, a temperature of at least about 450° C. will be employed, a preferred range being about from 575–700° C. The upper limit on calcining temperature will be dictated by the fusion temperature of the phases formed. As a rule, temperatures above about 1000° C. do not appear to be useful, particularly from the economic standpoint. Calcining time should be at least about 3 hours and preferably, at least about 6 hours. Usually more than 20 hours calcining time is unnecessary.

Examples of materials, preferably in finely-divided form, which can be heated to give the oxide interaction products employed as catalysts in accordance with this invention are bismuth trioxide and pentoxide and germanium monoxide and dioxide as well as compounds which decompose to the oxides at the calcination temperatures with the evolution of inert, and preferably volatile, byproducts, including inorganic compounds such as nitrates, carbonates, bicarbonates, chlorides, and hydroxides, and organic compounds such as lactates, oxalates, and acetates. Specific examples of decomposable starting materials are bismuth nitrate, carbonate, citrate, oxalate, and hydroxide. The aforementioned nickel and alkaline-earth modifying agents can be introduced in a like manner, that is, either as oxides or materials decomposable thereto.

Anions such as the phosphate, niobate, and titanate ions, as well as the oxides derived therefrom exhibit activity in combination with the catalyst used in this invention. They can be incorporated into the catalyst as oxides by introduction of the oxides per se or decomposable derivatives thereof prior to final heat treatment. Another method of incorporating such additives is to introduce them in the form of stable compounds with bismuth or germanium or with other modifying agents, e.g., as barium hydrogen phosphate.

The catalyst can be unsupported or it can be supported on a substrate. For use in unsupported form, the catalyst can conveniently be prepared by pelleting or extruding into masses of a desired size and shape. The calcination step can be performed either on the loose powder mixture or on the larger aggregates. If the calcination is performed on the powder, it generally is necessary to grind the calcined powder to a suitable granule size prior to aggregating it, e.g., by pelleting. In preparing the powder for pelleting, materials can be added thereto for such purposes as to facilitate agglomeration, provide the desired porosity, etc. For example, an aqueous solution of polyvinyl alcohol can be added to agglomerate the mixture. Such materials are burned out of the composition by heating, preferably at a gradual rate of temperature rise, generally to a temperature of about 300 to 600° C.

If desired, the bismuth composition can be extended on a support material, e.g., α-alumina, bauxite, pumice, kieselguhr, fuller's earth, silica gel, and other conventional supporting materials. In making such a supported catalyst, the support can be impregnated with the desired catalyst materials by any one of various techniques. For example, the support material can be agitated first in an aqueous solution of an oxygen-containing salt of bismuth, e.g., bismuth nitrate, and then a water-soluble germanium compound, e.g., germanium dioxide, while the water is evaporated off.

Additives can be incorporated into the composition either before or after the calcination step. Thus in some cases the additive may undergo some interaction with other components during the preparation, while in others the additive may be present simply as a physically admixed component.

Catalytic performance is affected by the molar proportions of oxides used in the catalyst. In all cases the proportions of oxides or other oxygen-containing compounds used should be such that the amount of free pure bismuth oxide is minor, i.e., less than 50% by weight. The preferred catalysts of this invention comprise the interaction product of bismuth trioxide and germanium dioxide in a molar ratio usually of at least 0.25 but no greater than about 4, and preferably about 0.5–1, optionally together with at least one of the aforementioned nickel and alkaline-earth additives.

Depending on their method of incorporation, the nickel and alkaline-earth additives may be converted to, and remain as, oxides, although this is not necessary. Obviously the compound(s) used to introduce additives should be such that no deleterious amounts of decomposition products, e.g., halides, can be produced during the catalyst preparation. When an oxygen-containing nickel compound is used as an additive in the bismuth composition, it is generally used in an amount sufficient to furnish about 0.1–1 mole of nickel oxide per mole of bismuth oxide or equivalent. More than 2 moles of nickel oxide per mole of bismuth oxide is not a preferred ratio. When an oxygen-containing alkaline-earth metal compound is used, it generally is used in an amount sufficient to furnish at least about 2% of the weight of the composition to which it is added. The optimum amount of alkaline-earth-metal oxide to achieve the desired effect, e.g., reduction in contact time, varies with different compositions, but generally is up to about 10%. There usually is no significant added benefit to be gained by exceeding about 20% by weight.

Treatment of the catalyst with dilute aqueous solutions, i.e., about 0.01 to 0.1 M, of phosphoric acid or a hydrohalic acid, e.g., hydrochloric acid, is beneficial in some cases, giving higher conversions at equivalent contact times, or equivalent conversions at shorter contact times.

In certain cases it is feasible to dilute the catalyst composition with certain metal oxides which by themselves do not form strongly catalytically active materials with bismuth oxide but which do not significantly impair the activity of the compositions described herein. Such oxides include, for example, stannic oxide, silica, alumina, and zirconia.

The interaction of bismuth oxide with germanium oxide and additives can be verified by X-ray diffraction techniques. These techniques have permitted the detection of the following crystalline phases in the bismuth compositions described in the examples: $\gamma^*$-$Bi_2O_3$, $\delta^*$-$Bi_2O_3$ solid solution with $GeO_2$, nickel oxide, and $Bi_{24}Ge_2O_{40}$. The $\gamma^*$-$Bi_2O_3$ and $\delta^*$-$Bi_2O_3$ phases are unstable phases of $Bi_2O_3$ stabilized by the presence of foreign ions. The $\gamma^*$ and $\delta^*$ designation is according to that suggested by G. Gattow and H. Schröder, Z. anorg. u. allgem. Chem. 318, 176–89 (1962).

As has been mentioned previously, the activity of the bismuth catalyst can be restored at suitable intervals by regeneration, e.g., by passing air, or air diluted with inert gas, through the composition.

The catalysts described above are used in accordance with this invention to catalyze the reaction of nitric oxide with a wide variety of compounds bearing methyl alpha to ethylenic or benzenoid unsaturation, that is, compounds having the active moiety

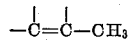

Examples of such compounds are aliphatic olefins, preferably olefinic hydrocarbons, such as propylene, isobutylene, 2-butene, isoprene and 2-hexene; cycloaliphatic olefins such as 1-methylcyclohexene; and aromatics such as toluene, the xylenes, mesitylene, 2-chlorotoluene, 2-nitrotoluene and methylnaphthalene; as well as heterocyclic compounds having ring unsaturation such as $\beta$-picoline, 2 - methylthiophene, and 2 - methylpyridine. Aliphatic monoolefinic hydrocarbons of 3 to 4 carbon atoms such as propylene and isobutylene, as well as toluene, the xylenes, and $\beta$-picoline, which yield, respectively, acrylonitrile, methacrylonitrile, benzonitrile, the phthalonitriles, and nicotinonitrile, are preferred. The reaction of propylene to give acrylonitrile is an especially preferred embodiment of this invention.

The nitrilation reaction is generally effected at temperatures within the range of about from 350° to 600° C. Below 350° C., the conversion drops; at temperatures higher than about 600° C., the effect of cracking of the unsaturated compound begins to be reflected in a marked drop in catalyst activity. Optimum results may be obtained at different temperatures with particular catalysts, ranging from about 380° C. to about 550° C., such range therefore being preferred. If it is desired to operate at the lower end of the temperature range, a system favoring such operation will be employed, i.e., a system containing an alkaline-earth oxide or nickel oxide.

The present process can be carried out at atmospheric pressure, although slight superpressures, e.g., up to about 5 atmospheres, are generally preferred from the point of view of ease of feed-stream processing.

The composition of the feed stream can vary from about 0.8–10 moles of unsaturated compound per mole of nitric oxide, higher ratios favoring higher conversions in some instances. However, it generally is unnecessary to use an unsaturate-to-nitric oxide molar ratio of greater than 3/1. Moreover, in the present process, excellent results can be attained with molar ratios of less than 3/1, e.g., as low as 1/2. Since ratios below 3/1 reduce recycling problems, such ratios are preferred.

In addition to unsaturated compound and nitric oxide, the feed stream can contain inert gases such as the rare gases, e.g., argon, as well as nitrogen, water vapor, and carbon dioxide, or a mixture of such gases. The nitric oxide used can be in the form of ammonia oxidation product gas consisting principally of nitrogen in addition to nitric oxide. The presence of saturated hydrocarbons, e.g., propane, is not deleterious in the present process. Generally, it is preferred to have the nitric oxide constitute about 9 to about 20 percent by volume of the feed gas; unsaturate less than three times the percent by volume of nitric oxide; and the remainder a diluent such as nitrogen.

The contact time is controlled by the feed rate and the catalyst bed volume, and generally is within the range of 0.1 to 10 seconds, preferably 0.8 to 8 seconds.

As is seen from the following examples, nitriles are obtained in excellent conversions and yields by the present process while, at the same time, operating conditions can be employed which are more satisfactory from an economical standpoint than those which have been required heretofore. Particularly notable are the high conversions achieved with the present process. Moreover, while good performance is seen to be obtained with compositions based on the interaction of bismuth oxide with germanium oxide, the addition of modifiers or additives in the form of oxygen-containing compounds of nickel and of the alkaline-earth metals gives added benefit. Depending on the specific composition, the addition of one or more of these modifiers thereto may permit, for example, operation at lower contact times, and the use of lower temperatures, lower unsaturate/nitric oxide volume ratios, larger amounts of nitric oxide in the feed gas, etc.

The following examples serve to illustrate specific embodiments of the process of the present invention. The terms "conversion" and "yield" appearing in the examples have the connotation given previously, i.e., moles of nitrile obtained per mole of nitric oxide fed, and moles of nitrile obtained per mole of nitric oxide consumed, respectively. In addition, it should be understood that the conversions and yields given do not represent the highest attainable with a particular catalyst composition but only the conversions and yields attained under the particular set of conditions employed. In any particular case, altering the conditions, for example increasing the contact time, changing the temperature, and using a higher unsaturate to nitric oxide ratio in the feed, could have the effect of increasing the conversion and/or yield.

*Examples 1 to 19*

Several catalysts based on bismuth trioxide and germanium dioxide, some having incorporated therein one or more additional modifiers, are prepared and then evaluated as described below. Details of the preparation and performance evaluation of the compositions as catalysts are summarized in Table I.

The general method of preparation comprises grinding a mixture of bismuth trioxide and germanium dioxide powders in a ball mill in the presence of acetone for 1.5 to 3 hours to a particle size such that the powders pass through a 325-mesh screen. The mixture is then pelleted by blending into it an aqueous solution of polyvinyl alcohol in order to form aggregates, removing excess liquid, and pressing the resulting product into 3/16-inch pellets. The pellets are calcined by heating under the conditions shown in the table, the heating up to about 500° C. being effected slowly to assure complete removal of polyvinyl alcohol.

When a liquid modifier is added, e.g., as in Examples No. 10, 13, and 14, the pellets are soaked in the liquid after calcination, and then dried.

When an additional "restricting" oxide or solid modifier is incorporated in the composition, e.g., as in Examples No. 2, 3, 4, 8, 9, 10, 11, 15, 16, 17, and 19, the catalyst, after calcination, is reground together with the additive in a ball mill in the presence of acetone, repelleted, and heat-treated as indicated in the table.

The germanium dioxide used in Examples No. 1 to 5 and 11 to 17 is prepared from germanium tetrachloride by hydrolyzing with dilute ammonium hydroxide followed by incomplete washing of the solid, leaving a small amount of chloride ion (as $NH_4Cl$) in the solid. The germanium dioxide employed to prepare the catalysts in the remaining examples is the commercially available product.

Catalyst performance is evaluated by packing the pellets into a tubular reactor operating at the temperatures specified in the table, and passing a gaseous mixture of nitric oxide, propylene, and nitrogen through the catalyst bed at a pressure of 8 p.s.i.g. The contact time is controlled by the catalyst bed volume and feed rate of the gas mixture. The reactor is operated with each composition for a number of cycles, each generally varying in duration from about 0.5 to about 1.0 hour. Between cycles, air is passed through the catalyst bed, generally for a period of time equivalent to one-half a cycle length. The catalyst age reported in the table is the time the composition has been subjected to the nitrile synthesis conditions prior to the cycle reported. In the "Feed Composition" column, it is understood in all cases that the remainder of the gas mixture is nitrogen.

TABLE I

| Example No. | Catalyst Preparation | | | | Catalyst Performance | | | | | | | |
|---|---|---|---|---|---|---|---|---|---|---|---|---|
| | $Bi_2O_3$/$GeO_2$ Molar Ratio | Other Oxides [1] | Additive [1] | Heating Procedure | Propylene-NO Reaction Conditions | | | | | | Conv. to ACRN [2] | Av. Yield of ACRN [2] |
| | | | | | Temp. (°C.) | Contact Time (sec.) | Feed Compn. (Vol. percent) | | Catalyst Age (hrs.) | Cycle Length (hrs.) | | |
| | | | | | | | Propylene | NO | | | Av. | Peak | |
|---|---|---|---|---|---|---|---|---|---|---|---|---|---|
| 1 | 1/1 | | | 20 hrs. at 600° | 485 | 3.0 | 27 | 9 | 3 | 2 | 0.47 | 0.50 | 0.49 |
| 2 | 1/1 | | $BaHPO_4$ (5%) | Same as Ex. 1 except reground with additive, repelleted, heated at 325° for 3 hrs. | 465 / 475 | 2.0 / 2.0 | 27 / 28 | 9 / 14 | 0 / 1 | 1 / 1 | 0.54 / 0.45 | 0.55 / 0.49 | 0.79 / 0.63 |
| 3 | 1/1 | | $BaHPO_4$ (20%) | Same as Ex. 2 | 470 | 2.0 | 27 | 9 | 1.5 | 1 | 0.47 | 0.49 | 0.64 |
| 4 | 1/1 | | $BaHPO_4$ (5%) NiO (15%) | do | 480 | 2.0 | 18 | 9 | 3 | 1 | 0.42 | 0.46 | 0.42 |
| 5 | 1/1 | | | 10 hrs. at 575°; then 10 hrs. at 600°. | 465 | 5.0 | 27 | 9 | 7 | 1 | 0.50 | 0.51 | |
| 6 | 2/1 | | | 10 hrs. at 610°; then 4 hrs. at 575° (in $O_2$). | 490 | 5.0 | 27 | 9 | 2 | 0.5 | 0.41 | 0.42 | 0.48 |
| 7 | 1/1 | | | 10 hrs. at 575°; reground, repelleted, heated at 325° for 3 hrs. | 480 | 4.0 | 27 | 9 | 7 | 1 | 0.42 | 0.46 | |
| 8 | 1/1 | $TiO_2$ (11%) | | Same as Ex. 7 except $TiO_2$ added in regrinding step. | 485 | 3.0 | 27 | 9 | 1 | 1 | 0.42 | 0.43 | |
| 9 | 1/1 | $Nb_2O_5$ (20%) | | Same as Ex. 7 except $Nb_2O_5$ added in regrinding step. | 475 | 3.8 | 27 | 9 | 5 | 1 | 0.42 | 0.47 | |
| 10 | 1/1 | $Nb_2O_5$ (20%) | 0.1 M HCl | Same as Ex. 9 but product treated with HCl at 25° for 3 hrs. Heated few min. at 500°. | 460 | 4.0 | 27 | 9 | 3 | 1 | 0.46 | 0.48 | |
| 11 | 1/1 | | NiO (20%) | Same as Ex. 7 except NiO added in regrinding step. | 480 / 470 | 4.3 / 5.0 | 27 / 18 | 9 / 9 | 5 / 15 | 1 / 1 | 0.43 / 0.41 | 0.46 / 0.41 | |
| 12 | 1/1 | | | 10 hrs. at 575° | 490 | 4.0 | 27 | 9 | 4 | 2 | 0.47 | 0.50 | |
| 13 | 1/1 | | 0.01 M $H_3PO_4$ | 10 hrs. at 575°. After $H_3PO_4$ treatment, 1.5 at 120°, few min. at 500°. | 485 | 3.0 | 27 | 9 | 3 | 2 | 0.47 | 0.50 | 0.49 |
| 14 | 1/1 | | 0.1 M $H_3PO_4$ | 10 hrs. at 575°. 7 hrs. at 90-100° during $H_3PO_4$ soaking. | 485 / 480 | 4.0 / 3.0 | 27 / 27 | 9 / 9 | 3 / 5 | 1 / 1 | 0.49 / 0.47 | 0.50 / 0.50 | |

TABLE I—Continued

| Example No. | Catalyst Preparation ||||| Catalyst Performance |||||||||
| --- | --- | --- | --- | --- | --- | --- | --- | --- | --- | --- | --- | --- | --- |
| | Bi₂O₃/GeO₂ Molar Ratio | Other Oxides [1] | Additive [1] | Heating Procedure | Propylene-NO Reaction Conditions |||||| Conv. to ACRN [2] || Av. Yield of ACRN [2] |
| | | | | | Temp. (°C.) | Contact Time (sec.) | Feed Compn. (Vol. percent) || Catalyst Age (hrs.) | Cycle Length (hrs.) | Av. | Peak | |
| | | | | | | | Propylene | NO | | | | | |
| 15 | 1/1 | | BaHPO₄ (0.25%). | Same as Ex. 7 | 455 | 1.9 | 27 | 9 | 3.66 | 1 | 0.53 | 0.58 | |
| 16 | 1/1 | | Mg₃(PO₄) (0.28%). | do | 470 | 1.8 | 27 | 9 | 0 | 1 | 0.47 | 0.48 | 0.67 |
| 17 | 1/1 | | BaHPO₄ (1.2%). | do | 455 | 2.0 | 27 | 9 | 3 | 1 | 0.55 | 0.62 | |
| 18 | 1/2 | | | 10 hrs. at 610°; 4 hrs at 575° (in O₂). | 490 | 5.0 | 27 | 9 | 0.5 | 1 | 0.45 | 0.46 | 0.56 |
| 19 | 1/2 | Calcined mixture of Nb₂O₅, H₂SnO₃, addnl Bi₂O₃ (1/1/1) (20%). | | Nb₂O₅, H₂SnO₃, Bi₂O₃, heated at 600° for 16 hrs. at 550° for 4 hrs. (in O₂). Mixed with catalyst of Ex. 18, pelleted, heated at 350° for 3 hrs., 475° for 1.5 hrs. (in O₂). | 485 / 450 | 5.0 / 3.9 | 18 / 27 | 9 / 9 | 3.5 / 2.8 | 3 / 2 | 0.45 / 0.45 | 0.47 / 0.49 | 0.58 |

[1] Percent of total catalyst weight.  [2] ACRN = acrylonitrile.

Substitution of isobutylene, 2-butene, toluene, the xylenes, and β-picoline for propylene in comparable molar quantities relative to nitric oxide in Examples 1–19 similarly results in the formation of the respective nitriles.

I claim:

1. In the process for the preparation of unsaturated nitriles by the catalytic reaction of nitric oxide with unsaturated organic compounds bearing a methyl group bonded to a carbon atom which, in turn, is bonded to another carbon atom by a double bond, at a temperature of about 350° C. to 600° C., the improvement which comprises using a catalyst consisting essentially of a catalyst obtained by calcining bismuth oxide with germanium oxide at a temperature of about 450° C. to 1000° C., said catalyst containing less than about 50% by weight of free pure bismuth oxide.

2. A process of claim 1 wherein said catalyst is the product of the calcination at a temperature of about from 450° C. to 1000° C. of bismuth oxide and germanium oxide in a molar ratio of about from 0.25 to 4.

3. In the process for the preparation of acrylonitrile by the catalytic reaction of nitric oxide with propylene at a temperature of about from 350 to 600° C., the improvement which comprises using a catalyst consisting essentially of a catalyst obtained by the calcination at a temperature of about from 450 to 1000° C. of bismuth trioxide and germanium dioxide in a molar ratio of about from 0.25 to 4, said catalyst containing less than about 50% by weight of free pure bismuth oxide.

4. A process of claim 3 wherein said catalyst additionally contains at least one oxygen-containing compound of at least one of nickel, niobium, titanium or alkaline earth metals.

5. A process of claim 3 wherein said catalyst is additionally treated with about a 0.01 M to 0.1 M aqueous solution of an acid selected from the group consisting of phosphoric acid and hydrochloric acid.

References Cited

UNITED STATES PATENTS 3,125,538  3/1964  Arnold et al. _____ 260—465.3 X
3,157,688  11/1964 Arnold et al. _____ 260—465.3
3,184,415  5/1965  Huntley et al. ____ 260—465.3 X CHARLES B. PARKER, *Primary Examiner.*

J. P. BRUST, *Assistant Examiner.*